Dec. 7, 1937.       W. KÜNZE       2,101,030
EXPANSION PLUG FOR BARRELS AND OTHER TANKS,
FIRE TUBE AND WATER TUBE BOILERS
Filed Jan. 26, 1934
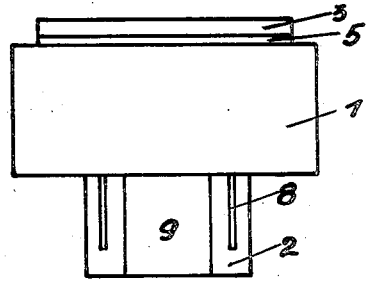
Fig. 1.
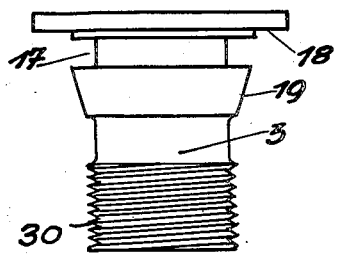
Fig. 5.
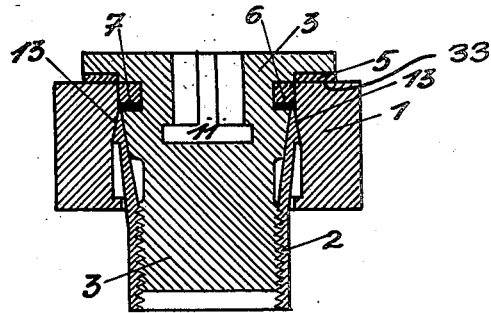
Fig. 2.
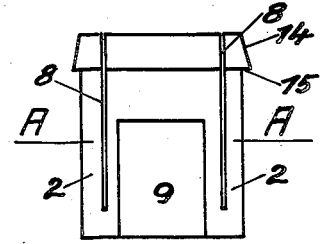
Fig. 6.
Fig. 7.
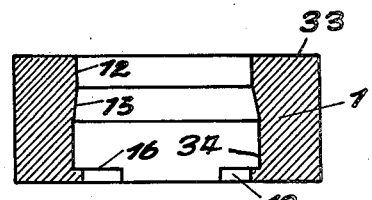
Fig. 3.
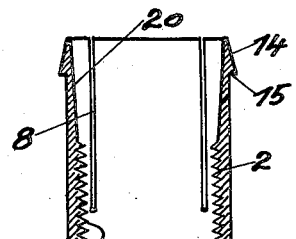
Fig. 8.
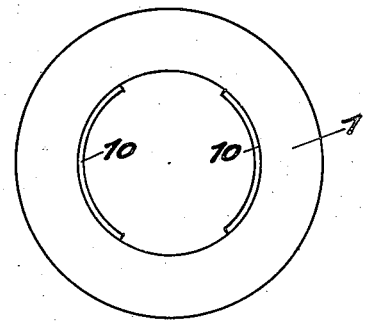
Fig. 4.
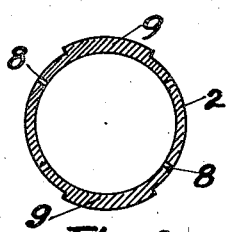
Fig. 9.
A-A.
Willy Künze Patented Dec. 7, 1937

2,101,030

UNITED STATES PATENT OFFICE 2,101,030

EXPANSION-PLUG FOR BARRELS AND OTHER TANKS, FIRE-TUBE AND WATER-TUBE BOILERS

Willy Kunze, Leipzig, Germany

Application January 26, 1934, Serial No. 708,471
In Germany March 21, 1933

3 Claims. (Cl. 220—24.5)

My invention relates to bungs for barrels, petrol tanks and like containers in which absolute fluid-tightness is essential. It is the object of my invention to provide a comparatively inexpensive, but very efficient bung device which shall be absolutely gas tight and capable of being readily inserted and removed.

Another object of the invention is to provide a bung device having two independent seals, namely, an external seal formed by a packing which is compressed between the outer surface of the container or bushing around the bung hole and an external flange of the bung device, and a second entirely separate internal seal formed by a packing which is compressed between an inner peripheral surface of the container or bushing and a corresponding peripheral surface of the bung device.

One embodiment of the invention is shown by way of example in the drawing in which:

Fig. 1 is an elevation of the complete bung device and the bushing,

Fig. 2 is an axial sectional elevation corresponding to Fig. 1 and showing the bung device in its operative position, Fig. 3 is a sectional elevation of the bushing, Fig. 4 is a top view of the bushing, Fig. 5 is an elevation of the plug of the bung device omitting the packing, Fig. 6 is a section through a pressure ring for the inner packing, Fig. 7 is an elevation of a slotted sleeve, Fig. 8 is a sectional elevation corresponding to Fig. 7 of the slotted sleeve, and Fig. 9 is a cross section of the slotted sleeve on line IX—IX of Fig. 7.

The bung device consists of a main plug, designated as a whole by the numeral 3, a sleeve movable on said plug and designated as a whole by the numeral 2, an external packing 5, an internal packing 6 and a pressure ring 7. The plug 3 has at the upper or outer end a flange 18 covering the packing ring 5, an annular groove 17 adapted to receive a resilient packing 6, and a slotted pressure ring 7 for compressing said packing ring 6. The plug also has a conical downwardly tapering surface 19 and upon its lower portion external screw threads 30.

For operating the plug, a recess 11 is provided for the reception of a suitable key by means of which the plug can be turned and also removed in known manner. Upon the plug 3 is mounted a sleeve 2 which is provided in its lower portion with internal screw threads 31 and is formed at the top with a flange 21 having an upwardly tapering conical outer surface 14 and a plane surface 15. The sleeve is made of thin metal and has four longitudinal slots 8 extending from the upper end and ending a short distance above the lower end of the sleeve. The sleeve also has two diametrically opposite projections 9.

Figs. 7, 8 and 9 show the sleeve in its inoperative non-expanded condition. The container, barrel, petrol tank or the like or a bushing 1 inserted into the container and fixed therein airtightly in some known manner, is formed with an outer surface 33, an inner surface 12, which is preferably cylindrical, a conical surface 13 adjacent to the surface 12 which widens downwardly, a surface 34 adjacent to and below the conical surface 13 and two diametrically opposite projections 10 having end faces 22.

The operation is as follows:

The packings 5 and 6 as well as the pressure ring 7 are placed upon the plug, that is, the packing ring 5 is placed just under the flange 18 and the packing 6 and the pressure ring 7 are inserted into the recess 17. The plug 3 is then screwed into the sleeve 2 so that the lower edge of the conical surface 19 of the plug just enters the flange 14 and very slightly expands the sleeve at the top. The plug together with the sleeve, which latter resiliently grips the plug, is now inserted into the bung hole of the bushing 1 so that the projections 9 of the sleeve enter into the intervals between the projections 10 of the bushing. Contact of the end faces 23 of the projections 9 with the end faces 29 of the projection 10 prevents rotation of the sleeve in the bung hole. Accidental dropping of the sleeve into the container which might occur through accidental separation of the sleeve from the plug, is prevented by the lower face 15 of the sleeve being held by the upper face 16 of the projections 10. It will be understood that insertion of the bung device into the hole is quite easy, inasmuch as the packing 6 is not compressed and the outer surface 14 of the flange can pass easily through the cylindrical surface 12. A key is then inserted into the opening 11 of the plug 3 and is turned, carrying with it the plug 3, rotation of the sleeve 2 being prevented by the engagement of the projections 9 with the projections 10. By the turning of the plug 3, the slotted sleeve 2 is pulled upwards and is, at the same time, expanded by the action of the conical surface 19 upon the surface 20 of the sleeve. The upper edge of the sleeve now comes into contact with the pressure ring 7 whereby the packing ring 6 is compressed. At the same time, the conical surface 14 of the flange 21 presses against the conical surface 13 of the bushing 1 and grips the latter. The plug 3 is now, during further rotation, moved downwards so that the flange 18 is pressed against the packing 5. It will thus be seen that there are two seals which are independent, namely, the internal packing 6 which is compressed first and the external packing 5 which is compressed subsequently.

I claim:

1. A bung device for barrels, petrol tanks, or the like comprising in combination: a plug having at one end a flange for covering a bung hole and external screw threads at the other end, and also having an annular conical surface between said flange and said threads and an annular groove between said conical surface and said flange; a packing ring upon said plug under said flange; a resilient packing ring in said annular groove; a pressure ring for compressing said packing ring in said groove; a sleeve adapted to fit in a bung hole and over the threaded end of the plug, said sleeve having on one end internal screw threads for engaging the threads of said plug and at the other end longitudinal slots and an annular conical flange adapted to pass over the conical surface of said plug and to be compressed thereby against the bung hole.

2. A bung device for barrels, petrol tanks, or the like, comprising in combination: a plug having an external flange for covering a bung hole, and also having under said flange an annular groove and a packing and a pressure member for compressing said packing both arranged in said groove, and also having a conical downwardly tapering surface below said groove and also having external screw threads below said conical surface; a sleeve having an upper slotted portion and a lower internal screw threaded portion for engaging the external screw threaded portion of said plug, said upper slotted portion being adapted to pass over the conical surface of said plug and to be pressed thereby against the bung hole, and the upper edge of said upper sleeve portion being adapted upon insertion of the plug to press against said pressure ring and compress the packing in the groove of the plug, and means for preventing rotation of said sleeve in the bung hole upon rotation of the plug in the sleeve.

3. A bung device for barrels, petrol tanks or the like, comprising in combination: a bushing having a bung hole; a bung device comprising a plug having an external flange and a packing under said flange covering the outer surface of the bushing round the bung hole; said plug also having a groove under said flange, a compressible packing in said groove, and a pressure ring for compressing said packing, said plug also having a conical surface under said groove and external screw threads; an expandible slotted sleeve having threaded engagement with said plug and having at its upper end a flange having a conical upwardly tapering surface adapted to pass over the conical surface of said plug and to be compressed thereby against the bung hole; said bushing having a conical surface corresponding to said conical surface of said sleeve; and means for preventing rotation of said sleeve in said bushing.

WILLY KUNZE.